United States Patent
Gupta et al.

(10) Patent No.: US 8,868,057 B2
(45) Date of Patent: Oct. 21, 2014

(54) STAGING A MOBILE DEVICE TO AN ENTERPRISE NETWORK SECURELY USING VOICE CHANNEL OF A WIRELESS WIDE AREA NETWORK (WWAN)

(71) Applicant: Symbol Technologies, Inc., Schaumburg, IL (US)

(72) Inventors: Prakash Gupta, Allahabad (IN); Jimmy Joseph, Thiruvananthapuram (IN); Karthik Narayana, Bangalore (IN)

(73) Assignee: Symbol Technologies, Inc., Holtsville, NY (US)

( * ) Notice: Subject to any disclaimer, the term of this patent is extended or adjusted under 35 U.S.C. 154(b) by 91 days.

(21) Appl. No.: 13/684,852

(22) Filed: Nov. 26, 2012

(65) Prior Publication Data

US 2014/0146743 A1 May 29, 2014

Related U.S. Application Data

(62) Division of application No. 12/629,434, filed on Dec. 2, 2009, now abandoned.

(51) Int. Cl.
*H04M 3/00* (2006.01)
*H04M 3/493* (2006.01)
*H04W 4/00* (2009.01)

(52) U.S. Cl.
CPC ...................................... *H04W 4/00* (2013.01)
USPC ...... 455/418; 455/414.2; 455/419; 455/435.1

(58) Field of Classification Search
USPC ........ 455/410–411, 412.1, 413, 414.2, 414.3, 455/418–419, 425, 435.1; 705/14.64
See application file for complete search history.

(56) References Cited

U.S. PATENT DOCUMENTS

| 7,306,153 | B2 | 12/2007 | Chong et al. | |
|---|---|---|---|---|
| 7,653,183 | B2 * | 1/2010 | Patel et al. | 379/88.18 |
| 8,140,063 | B2 | 3/2012 | Joseph et al. | |
| 2006/0239434 | A1 | 10/2006 | Acharya | |
| 2007/0263796 | A1 * | 11/2007 | Patel et al. | 379/88.01 |
| 2010/0291912 | A1 * | 11/2010 | Tafarrodi et al. | 455/419 |

OTHER PUBLICATIONS

Non-Final Office Action dated Jun. 12, 2012 in parent U.S. Appl. No. 12/629,434 Prakash Gupta et al., filed Dec. 2, 2009.
Restriction Requirement dated Feb. 27, 2012 in parent case U.S. Appl. No. 12/629,434 Prakash Gupta et al., filed Dec. 2, 2019.
Notice of Non-Compliant Amendment dated Oct. 30, 2012 in parent case U.S. Appl. No. 12/629,434 Prakash Gupta et al., filed Dec. 2, 2009.

* cited by examiner

Primary Examiner — Wesley Kim

(57) ABSTRACT

Wireless networking systems and methods are provided for "staging" a wireless communication device (WCD). The WCD is designed to communicate over the air with a wireless communication station via RF signals. Network infrastructure (NI) that receives a call from the WCD (via the wireless communication station), can authenticate the WCD. Once authenticated, the NI can communicate an RF signal that includes the encrypted staging data to the WCD over an RF channel. The staging data can include settings for the WCD and/or a list of software packages to be installed on the WCD and their respective server locations. When the WCD receives the RF signal, the WCD can convert (e.g., decode) the received RF signal to generate digital data. The WCD can then decrypt the digital data to generate decrypted staging data that can be used to stage the WCD.

4 Claims, 9 Drawing Sheets

STAGING A MOBILE DEVICE TO AN ENTERPRISE NETWORK SECURELY USING VOICE CHANNEL OF A WIRELESS WIDE AREA NETWORK (WWAN)

REFERENCE TO RELATED APPLICATION

This divisional application claims priority to U.S. application Ser. No. 12/629,434, having a filing date of Dec. 2, 2009, assigned to the assignee hereof.

TECHNICAL FIELD

The present invention generally relates to enterprise networks that include enterprise computing devices, and more particularly relates to staging of such enterprise computing devices.

BACKGROUND

In recent years the use of cellular phones, smart phones, global positioning systems (GPS), personal data assistants (PDAs), laptop computers, and other such mobile units has increased dramatically. In any given enterprise, it is not uncommon for many thousands of mobile units to be present within the system. Extending business applications and data to mobile devices delivers a significant increase in employee productivity. It is therefore an expensive, time-consuming and critical task to administer large groups of mobile units, particularly when their use is important to day-to-day operation of the enterprise.

Recently companies have developed solutions that can allow network administrators to manage a group of enterprise mobile devices in a centralized manner, for instance, from a centralized Network Operations Center (NOC). For instance, Motorola, Inc. has developed a device management system called the Mobility Services Platform (MSP). MSP can dramatically reduce the time and cost associated with day-to-day management of mobile devices. Device management systems such as MSP can significantly reduce the time and cost required to manage a large number of mobile devices. This device management system can be used to manage hundreds of devices in a local site or tens or hundreds or thousands of mobile computers around the world from one centralized computer. Minimal hands-on time is required for staging of mobile devices for initial use, and ongoing provisioning and troubleshooting can be completely managed remotely via an anywhere and anytime web-based interface. Manual procedures are automated, eliminating errors. Among other things, MSP allows a network administrator to get devices up and running right out of the box, and ensures that devices are always loaded with the most current applications and operating system software. MSP enables a network administrator to constantly monitor and rapidly troubleshoot device issues to keep users up, running and productive.

MSP-like systems provide advanced staging capabilities for configuring network and device settings and loading software (e.g., operating systems and initial applications) simply, easily, securely and remotely. MSP-like systems can allow a single point of control (e.g., administrator at a network operations center (NOC)) to issue automated template-based configurations enabling tens or hundreds or thousands of mobile devices to be staged in minutes rather than months. This frees up hundreds (or more) of hours that would otherwise be spent on manual, error-prone efforts. Support for multiple device staging methods ensures one step simplicity for users, who can complete the staging by (1) scanning a series of rapid deployment bar codes, sending a short message service (SMS) message, (2) sending data over Bluetooth or other infrared (IR) systems, (3) performing an ActiveSync, (4) docking the device in a cradle connected to a PC or computer network, or (5) simply connecting to a pre-defined staging network.

Notwithstanding these advances it is desirable to provide other alternative systems and methods for staging the devices in an enterprise network. Furthermore, other desirable features and characteristics of the present invention will become apparent from the subsequent detailed description and the appended claims, taken in conjunction with the accompanying drawings and the foregoing technical field and background.

BRIEF DESCRIPTION OF THE DRAWINGS

A more complete understanding of the present invention may be derived by referring to the detailed description and claims when considered in conjunction with the following figures, wherein like reference numbers refer to similar elements throughout the figures.

DETAILED DESCRIPTION

Figure 1:
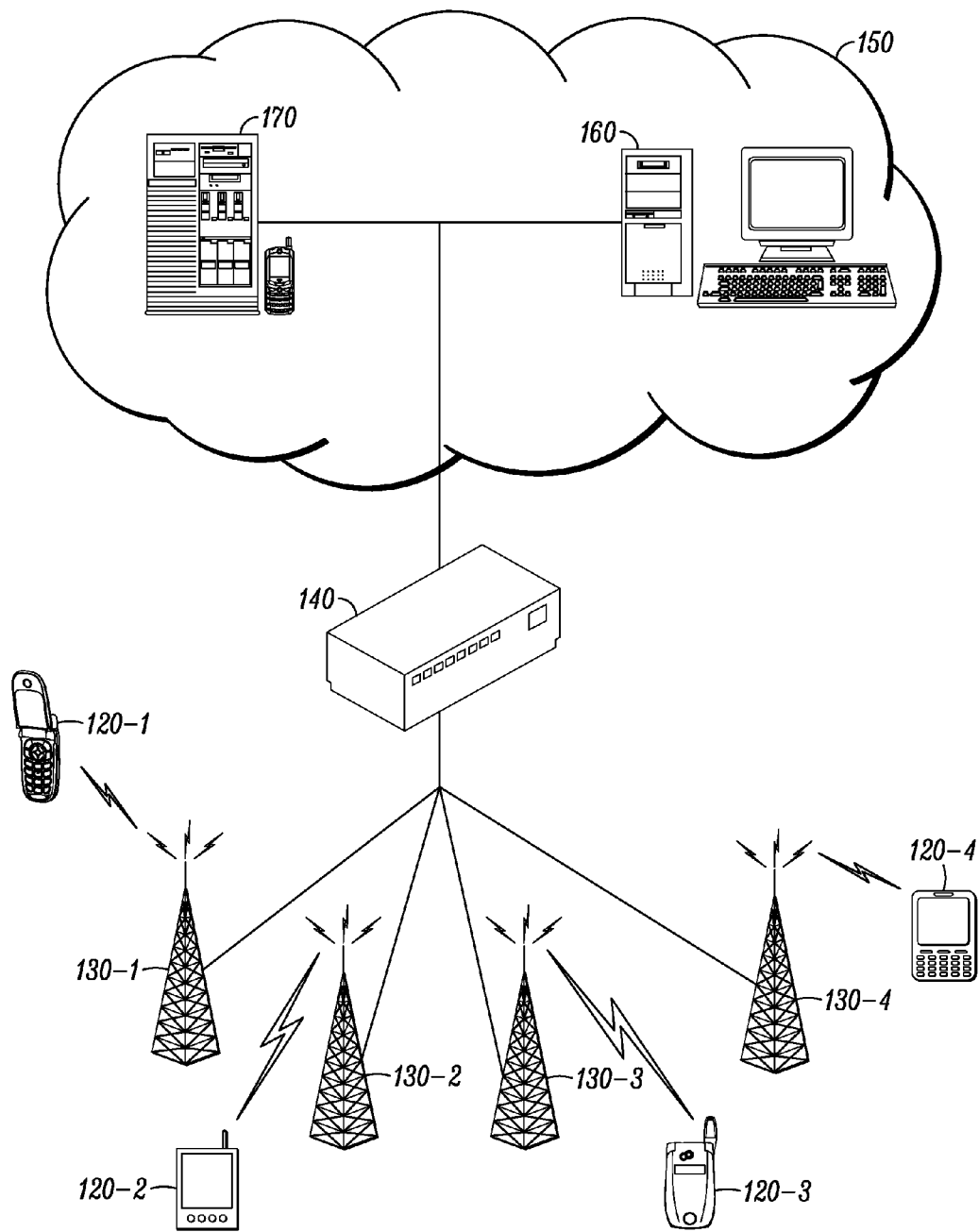
FIG. 1 is a block diagram of an exemplary system which can be used in accordance with the disclosed embodiments.

The following detailed description is merely exemplary in nature and is not intended to limit the invention or the application and uses of the invention. Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary or the following

DETAILED DESCRIPTION

Before describing in detail embodiments that are in accordance with the present invention, some of the terms used herein will be defined.

As used herein, the term "authentication" (or variants thereof) refers to the act of establishing or confirming that something is authentic. An authentication process involves the interchange of information between a wireless communication device and another entity so that each can prove its identity to the other.

As used herein, the term "encryption" (or variants thereof) refers to the process of encoding or transforming information (sometimes referred to as plaintext) via an algorithm (sometimes called cipher) to generate encrypted information (sometimes referred to as ciphertext) that is unreadable to anyone except for intended recipients possessing special knowledge (e.g., an encryption key). Encryption is used to prevent unauthorized access to the data that is encrypted and protect data when being transferred over a network.

As used herein, the word "exemplary" means "serving as an example, instance, or illustration."

As used herein, the term "decryption" (or variants thereof) refers to the process of making encrypted information readable again (i.e., restoring encrypted information to its original form).

As used herein, the term "key" refers to a piece of information used to transform plaintext into ciphertext, or vice versa. An encryption key is a sequence of data that is used to encrypt other data (i.e., generate encrypted data). The same key is required to decrypt the encrypted data.

As used herein, the term "staging" (or variants thereof) refers to preparing a wireless communication device for initial use in enterprise infrastructure. In this regard, staging refers to configuring a wireless communication device with network settings needed to allow it to connect to a server in the enterprise network, and then download and install software needed for making the device ready to be used in an enterprise environment. In some implementations, staging includes configuring network and device settings on a wireless communication device as well as loading software (e.g., operating systems and applications) on the wireless communication device. During staging, automated template-based configurations can be issued to a device and used to stage that device.

As used herein, the term "staging data" refers to initial data required by a wireless communication device to address and connect to a server on the enterprise network and obtain a list of software (e.g., operating systems and applications) to be requested from that server. Staging data can include settings for the wireless communication device and/or a list of software packages to be installed on the wireless communication device and their respective server locations.

Overview

Before describing in detail embodiments that are in accordance with the present invention, it should be observed that the embodiments reside primarily in combinations of method steps and apparatus components related to staging enterprise devices. Conventional techniques that relate to authentication of wireless communication devices, encoding/decoding of data, encryption/decryption of data, speech/voice recognition of data, will not be described in detail herein.

Embodiments of the present invention relate to wireless networking systems and methods for "staging" a wireless communication device (WCD). In one embodiment, the WCD is designed to communicate over the air with a wireless communication station (e.g., access point or base station) via RF signals. When network infrastructure (NI) (e.g., a server) receives a call from the WCD (via the wireless communication station), the NI can authenticate the WCD, and once authenticated, the NI can communicate an RF signal to the WCD over an RF channel. The RF signal includes encrypted staging data, where the staging data can include settings for the WCD and/or a list of software packages to be installed on the WCD and their respective server locations. The WCD can convert (e.g., decode) the received RF signal to generate digital data, and then decrypt the digital data to generate decrypted staging data that can be used to stage the WCD.

Embodiments of the present invention can apply to a number of network configurations. Prior to describing some embodiments with reference to FIGS. 2-8, an example of a wireless communication network configuration in which these embodiments can be applied will now be described with reference to FIG. 1.

FIG. 1 is a block diagram of an exemplary system 100 which can be used in accordance with the disclosed embodiments. The system comprises a plurality of wireless communication devices (WCDs) 120, a wireless communication stations (WCSs) 130, a wide area network (WAN) gateway 140, an enterprise IP network 150 that includes a computer 160 that can be located at a Network Operations Center (NOC) and a Mobility Management Server (MMS) 170 that can also be located at NOC or remotely with respect to the NOC. Although not shown, the enterprise IP network 150 can include a "destination" such as an IVRS, a voicemail server, etc.

Each of the WCDs 120 can communicate with at least one of the WCSs 130 over a wireless communication link. The WCSs 130 are coupled to the WAN gateway 140 via a wired connection, and the WAN gateway 140 is coupled to the enterprise IP network 150 via another wired connection. The WCSs 130 can be, for example, a base station (BS) when part of a cellular communications network, or an access point (AP) when part of a Wireless Local Area Network (WLAN).

As used herein, the term "wireless communication device" refers to any portable computer or other hardware designed to communicate with an infrastructure device over an air interface through a wireless channel. In many cases a wireless communication device is "handheld" and potentially mobile or "nomadic" meaning that the wireless communication device 900 can physically move around, but at any given time may be mobile or stationary. The wireless communication devices 900 can be one of any of a number of types of mobile computing devices, which include without limitation, mobile stations (e.g. mobile telephone handsets (sometimes also referred to as a mobile station (MS), mobile unit (MU), subscriber station, or user equipment (UE))), mobile radios, mobile computers, hand-held or laptop devices and personal computers, a PC card, personal digital assistants (PDAs), or the like), access terminals, compact flash, external or internal modem, an RFID reader, or the like, or any other devices configured to communicate via wireless communications.

The wireless communication device 900 can communicate in accordance with any known wireless communication standards including telecommunication standards such as $3^{rd}$ Generation Partnership Project (3GPP), $3^{rd}$ Generation Partnership Project 2 (3GPP2), Global System for Mobile communication (GSM), Code Division Multiple Access (CDMA), Wide-band CDMA (WCDMA), Universal Mobile Telecommunications System (UMTS), Long Term Evolution (LTE) and the like) and those based on ad hoc networking standards (e.g., IEEE 802.91, IEEE 802.16, Worldwide Interoperability for Microwave Access (WiMax), and the like). The wireless communication device 900 is designed to operate within a Wireless Wide Area Network (WWAN) over a cellular air interface (e.g., GSM, CDMA, WCDMA, UMTS, and the like) and/or an ad hoc networking air interface (e.g., IEEE 802.11 WLAN interfaces, IEEE 802.16 interfaces, WiMax interfaces, and the like). The wireless communication devices 120 may be configured to communicate via WLAN protocols (IEEE 802.11 protocols), IrDA (infrared), Bluetooth, ZigBee (and other variants of the IEEE 802.15 protocol), IEEE 802.16 (WiMAX or any other variation). As used herein, "IEEE 802.11" refers to a set of IEEE Wireless LAN (WLAN) standards that govern wireless networking transmission methods. IEEE 802.11 standards have been and are currently being developed by working group 11 of the IEEE LAN/MAN Standards Committee (IEEE 802). Any of the IEEE standards or specifications referred to herein may be obtained at http://standards.ieee.org/getieee802/index.html or by contacting the IEEE at IEEE, 445 Hoes Lane, PO Box 1331, Piscataway, N.J. 08855-1331, USA. Any of the IEEE standards or specifications referred to herein are incorporated by reference herein their entirety.

When the wireless communication device (WCD) operates in a wireless cellular network (i.e., uses mobile telecommunication cellular network technologies to transfer data), it communicates with a fixed base station (BS) that is coupled to a wired core network, and when it operates in a WLAN, the WCD can communicate with an access point or access port that is could to a wired network. As used herein, the term "uplink (UL) or reverse link (RL)" refers to a communication link for carrying information from a station to a base station (or alternatively an access point), and can also refer to a transmission from a station to a base station. As used herein, the term "downlink (DL) or forward link (FL)" refers to a communication link that carries information from a base station (or alternatively an access point) to a station and can also refer to a transmission from a base station to a station. In the embodiments described herein, the UL and DL are implemented using multiple access methods including any one of FDMA, TDMA, CDMA, WCDMA, and OFDMA.

Each of the WCDs 120 can communicate directly with a WCS 130 over wireless communication links, which are illustrated in FIG. 1 using lightening bolts. A WCD is potentially mobile (i.e., not fixed) and can be mobile at any particular time, whereas the WCS 130 is typically fixed at a particular location. Although not illustrated, each WCD 120 includes at least one antenna, a transceiver, at least one port, a controller and memory. The transceiver is used to transmit and receive both data and control/signaling/management information transmitted from the WCS 130 via the antenna(s). The port is used for communications with WCS 130 and is coupled to the controller for operation of the WCD 120. Each of the ports employs conventional demodulation and modulation techniques for receiving and transmitting communication signals to and from the WCD 120, respectively, under the control of the controller. To perform the necessary functions of the WCD 120, the controller is coupled to the memory, which preferably includes a random access memory, a read-only memory (ROM), an electrically erasable programmable read-only memory (EEPROM), and flash memory. The memory can be integrated within the WCD 120, or alternatively, can be at least partially contained within an external memory such as a memory storage device. The memory storage device, for example, can be a subscriber identification module (SIM) card. A SIM card is an electronic device typically including a microprocessor unit and a memory suitable for encapsulating within a small flexible plastic card. The SIM card additionally includes an interface for communicating with the WCD 120.

The WCS 130 can communicate data and/or control signaling information with the WCDs 120-*n*, where an uplink can carry data and/or control information transmitted from a WCD 120 to the WCS 130 and a downlink can carry data information and/or control or signaling information transmitted from the WCS 130 to a WCD 120. In some implementations, WCDs may communicate information directly with each other over peer-to-peer communication links (not illustrated) that carry information from one WCD to another.

The WCS 130 comprises antennas, a transceiver, circuitry for analog-to-digital conversion and vice-versa, a plurality of ports, a controller that includes a resource scheduler module that schedules uplink resources for communications with various WCDs 120-*n*, and a memory.

Each port provides an endpoint or "channel" for network communications by the WCS 130. Each port can be used to transmit and receive both data and control, signaling or management information. A backhaul port can provide an endpoint or channel for backhaul communications by the WCS 130 with the core network 125. For example, the WCS 130 can communicate with a wired backhaul via the backhaul port. Each of the ports are coupled to the controller for operation of the WCS 130. Each of the ports employs conventional demodulation and modulation techniques for receiving and transmitting communication signals respectively, such as packetized signals, to and from the WCS 130 under the control of the controller. The packetized signals can include, for example, voice, data or multimedia information, and control information. As used herein, the term "data" can refer to, for example, data generated by applications, a network management entity, or any other higher-layer protocol entities. Examples of user data include, for example, packets generated by voice, video, e-mail, file transfer applications and network management agents. As used herein, the term "control information" can refer to, for example, messages and signaling used by the media access control (MAC) layer and physical (PHY) layer to carry out its own protocol functionality. Control information includes periodic control information and aperiodic control information. As used herein, the term "periodic control information" can refer to, for example, preambles, midambles, synchronization sequences, timing and frequency correction channels or any other signaling used to ensure correct reception of the messages transmitted in a frame. Examples of periodic control information include, for example, frame control information, a synchronization channel, preamble information, information regarding the frame structure, markers which flag the start of the frame, and other types of control information. As used herein, the term "aperiodic control information" can refer to, for example, messages transmitted aperiodically to ensure proper protocol behavior and WCD upkeep. Examples of aperiodic control information include, for example, management and control information, such as capability announcements, ranging messages, measurement reports, and handoff instructions.

To perform the necessary functions of the WCS 130, the controller is coupled to the memory, which preferably includes a random access memory, a read-only memory (ROM), an electrically erasable programmable read-only memory (EEPROM), and flash memory. The memory can be integrated within the WCS 130, or alternatively, can be at least partially contained within an external memory such as a memory storage device.

The MMS 170 is configured to communicate with a plurality of wireless computing devices 120 (e.g., wirelessly or through a wired connection or using one or more intermediate switches, routers, relay servers, access points, or the like). The MMS 170 can include any combination of hardware and software capable of carrying out the functions described herein. In that regard, the MMS 170 may also include various networking components, databases, consoles, etc., which, for the sake of clarity, are not illustrated in the figures. In one embodiment, for example, the MMS 170 corresponds to one of the various Mobility Service Platform (MSP) servers provided by Motorola, Inc. In one implementation, the MMS 170 resides at a Network Operations Center (NOC) and communicates with devices 120 via one or more Relay Servers (not illustrated) which are used to relay information to and from devices 120 being managed by server. Although not illustrated in FIG. 1, the MMS 170 includes a module that communicates with a device agent module (not illustrated) on each of the devices 120. The MMS 170 makes high level decisions, deploys executable code and data to the device agent modules as needed, collects results, generates reports of the results, and determines future action that are required. The device agent module analyzes actual real-time conditions on the device, based on previously deployed information from the control server, performs local remediation and logging, and sends periodic updates to the control server for tracking, forensic, and future planning purposes.

Figure 2:
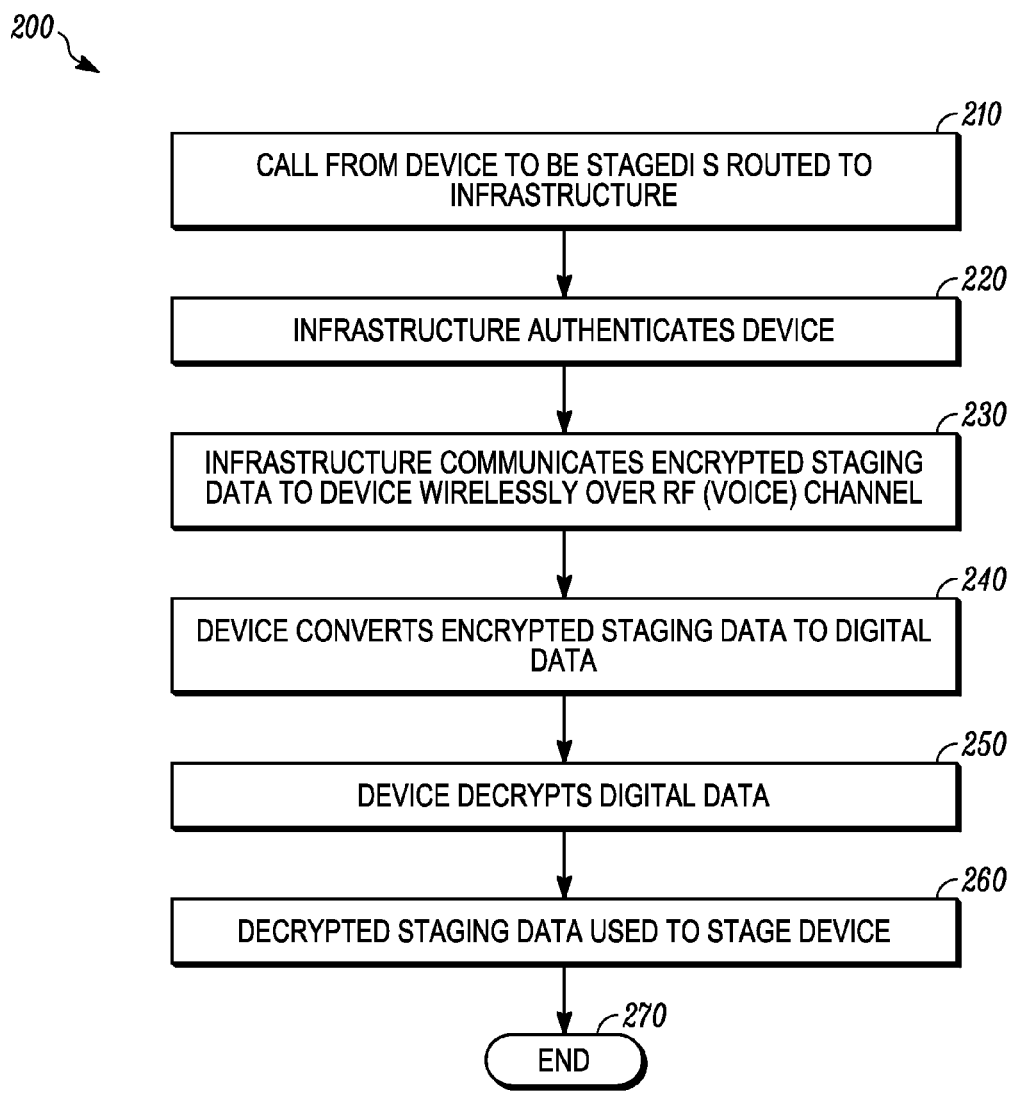
FIGS. 2-8 are flowcharts illustrating different methods for staging a wireless communication device over a wireless network in accordance with various embodiments of the present invention.

FIG. 2 is a flowchart illustrating a method 200 for staging a wireless communication device 120 over a wireless network in accordance with some embodiments of the present invention.

Method 200 begins when a wireless communication device 120 that needs to be staged transmits a call over the air that is received by a base station or access point and routed to network infrastructure 140.

At optional step 220, the network infrastructure 140 authenticates the device. Any known authentication method can be used including one-way authentication mechanisms or mutual authentication mechanisms.

Once the wireless communication device 120 is authenticated, the method 200 proceeds to step 230 where the network infrastructure 140 communicates encrypted staging data to an access point or base station, which relays the encrypted staging data to the wireless communication device 120 over an RF channel, such as a RF voice channel. In any of the embodiments described herein, it will be appreciated that the network infrastructure 140 can generate the encrypted staging data on demand or dynamically, whereas in other implementations, the encrypted staging data can be generated elsewhere and stored at the network infrastructure, in which case the network infrastructure communicates the encrypted staging data to the wireless communication device.

The disclosed embodiments provide a secure mechanism for delivering staging data to the WCD over wireless channel of a WAN. In accordance with the disclosed embodiments, cryptographic encryption techniques are employed to secure over-the-air (OTA) communication between the network infrastructure and WCDs so that staging data can be transmitted securely to the WCDs. The staging data can be encrypted using any known encryption technique. Infrastructure can encrypt staging information using a cipher or encryption algorithm and an encryption key. A secret encryption key can be used to encode information using the encryption algorithm, and the encrypted information can then be transmitted securely toward its destination WCD 120. The encryption key used to decrypt the encrypted staging data can be any known type of encryption key including, for example, pre-configured keys, public-keys, etc. For example, in one implementation, the key can be pairwise-master-keys (PMKs) from which multiple session keys (PTKs) are derived. In other implementations, the encryption key can be based on a public-private key pair. The encryption key can be provisioned on the wireless communication device or derived using any known techniques. In some implementations, the encryption keys can be manually pre-placed, pre-loaded or pre-configured on the WCDs 120, for example, a system administrator. In other implementations, the encryption keys can be derived using any techniques known to those skilled in the art. For instance, in one exemplary implementation, WCDs can use protocols specified in the IEEE 802.11i and 802.1X standards to negotiate parameters and encryption key pairs. In another exemplary implementation, WCDs can negotiate encryption keys using, for example, an authenticated-Diffie-Hellman protocol.

When symmetric or "secret-key" type cryptography is employed, symmetric key algorithms use identical encryption and decryption keys to encrypt and decrypt the information. Thus, to exchange enciphered data a single key value must be shared between the originator and the recipient.

When asymmetric or "public-key" type cryptography is employed, asymmetric key exchange (AKE) algorithms use separate public and private keys. Existing asymmetric key exchange algorithms include, for example, Diffie-Hellman, Rivest, Shamir, and Adelman (RSA), Digital Signature Algorithm (DSA), ElGamal, and Elliptic Curve Cryptography (ECC). In such asymmetric cryptographic systems, a single operation is used to generate the pair of public and private keys. The public key can be made publicly available and can be safely shared with all nodes that will participate in a secure communication. The private key is kept secure or secret by the entities that share the key pair. To exchange encrypted staging data the WCD and infrastructure entity that is participating in the exchange each make their public key available, and keep their private key secret. The keys are typically different from each other, but neither key can be deduced from the other. Because the private key needs to be kept only by the WCD, it never needs to be transmitted over any potentially compromised networks. The entities can generate symmetric private keys through the exchange of public keys. The entities agree beforehand on the exact algorithm to use, and each entity then selects a random number as a private key and uses the algorithm and the random number to generate a public key. The entities exchange public keys and then each generates a session key using their own private key and the other's public key. Even though neither entity knows the other's private key, session keys of both are identical. Staging data enciphered by using one key of the pair may be deciphered using the other key of the pair. The infrastructure entity enciphers the staging data using the public key of the recipient WCD 120. The recipient WCD 120 is then able to decipher the received data using his own private key. A third party intercepting the public keys but lacking knowledge of either private key cannot generate a session key. Therefore, data can be securely encrypted with the session key. Because one key pair is associated with one WCD, even on a large network, the total number of required keys is much smaller than in the symmetric case. To avoid a speed penalty, in some implementations, the WCD can use AKE only to establish the public key (shared by both entities) and then revert to fast symmetric-key encryption algorithm such as the Advanced Encryption Standard (AES) to decrypt the traffic.

At step 240, the wireless communication device 120 receives the RF signal that was communicated over the RF channel and converts the encrypted staging data into digital data. Any known method for converting the RF signal into digital data can be utilized at step 240.

At step 250, the wireless communication device 120 can decrypt the digital data using an encryption key to generate decrypted staging data that can be used at the wireless communication device 120. In order to decode the encrypted information, the destination WCD must use the same secret encryption key that was used to encrypt the information and apply a cipher or decryption algorithm.

At step 260, the device 120 uses the decrypted staging data to perform "staging" as described above. The method ends at step 270.

Figure 3:
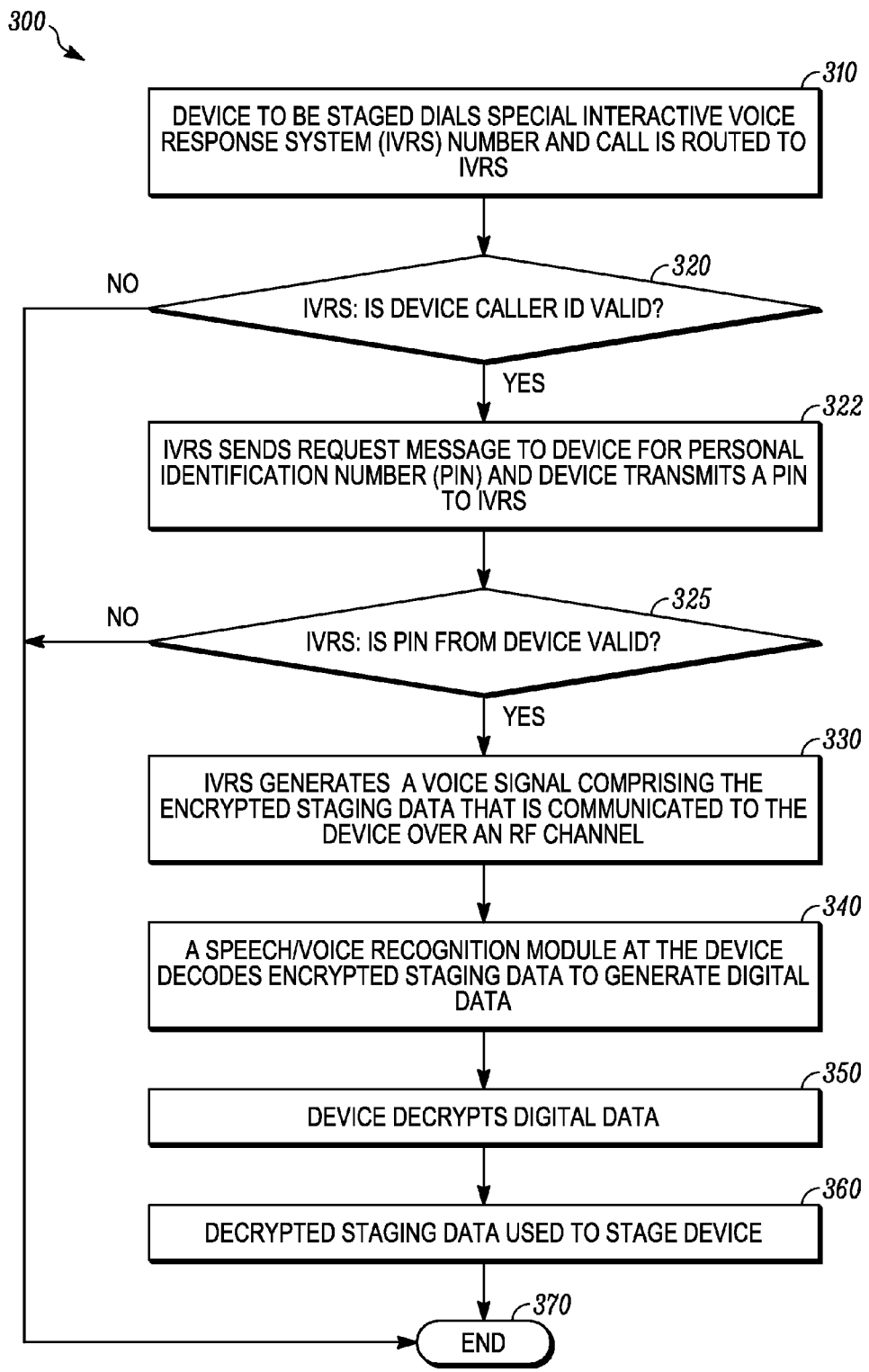

FIG. 3 is a flowchart illustrating a method 300 for staging a wireless communication device 120 over a wireless network in accordance with some embodiments of the present invention.

Method 300 begins at step 310 when a wireless communication device 120 that needs to be staged dials a special interactive voice response number to transmit a call over the air that is received by a base station or access point. The call is routed to an interactive voice response system (IVRS) in network infrastructure 140. As used herein, an interactive voice response system (IVRS) refers to interactive technology that allows a computer to detect voice and keypad inputs. An IVRS allows users to access a information via a telephone touchtone keypad or by speech recognition. IVR systems can respond with pre-recorded or dynamically generated audio to further direct users on how to proceed.

At steps 320-325, the IVRS authenticates the wireless communication device 120. Any known authentication method can be used. In one implementation, at step 320 the IVRS infrastructure determines whether the caller ID associated with the wireless communication device 120 is valid. As used herein, the term "caller identification (ID)" or variants thereof refers to a numeric or alphanumeric identifier that automatically identifies a wireless communication device from which it originates. If not, the method 300 ends step 370. When the caller ID associated with the wireless communication device 120 is valid, the method 300 proceeds to step 322, where the IVRS transmits a request message to the wireless communication device 120 for a personal identification number (PIN), and the wireless communication device 120 responds by transmitting a PIN that is routed to the IVRS. As used herein, personal identification number (PIN) refers to a secret numeric password shared between a user and a system that can be used to authenticate the user to the system. Typically, the user is required to provide a non-confidential user identifier or token and a confidential PIN to gain access to the system. Upon receiving the User ID and PIN, the system looks up the PIN based upon the User ID and compares the looked-up PIN with the received PIN. The user is granted access only when the number entered matches with the number stored in the system At step 325, the IVRS determines whether the PIN transmitted from the wireless communication device 120 is valid. If not, the method 300 ends step 370.

When the PIN transmitted from the wireless communication device 120 is valid, the wireless communication device 120 is authenticated and the method 300 proceeds to step 330. At step 330, the IVRS can generate a voice signal that is encoded with encrypted staging data, and communicate voice signal to an access point or base station, which relays the voice signal to the wireless communication device 120 over an RF channel, such as a RF voice channel. The voice signal can be a computer generated voice signal or an actual voice signal. The staging data can be encrypted using any known encryption technique. As above, the wireless communication device 120 can generate (e.g., from storage or via derivation) an encryption key that can be used to decrypt the encrypted staging data. The method 300 then proceeds to step 340.

At step 340, the wireless communication device 120 receives the voice signal via the RF signal that was communicated over the RF channel and a speech/voice recognition module at the wireless communication device 120 decodes the encrypted staging data in the voice signal to generate digital data. Any known method for speech/voice recognition can be utilized at step 340.

At step 350, the wireless communication device 120 can decrypt the digital data using an encryption key stored at the wireless communication device 120 to generate decrypted staging data that can be used at the wireless communication device 120.

At step 360, the wireless communication device 120 uses the decrypted staging data for staging, and the method ends at step 370.

Figure 4:
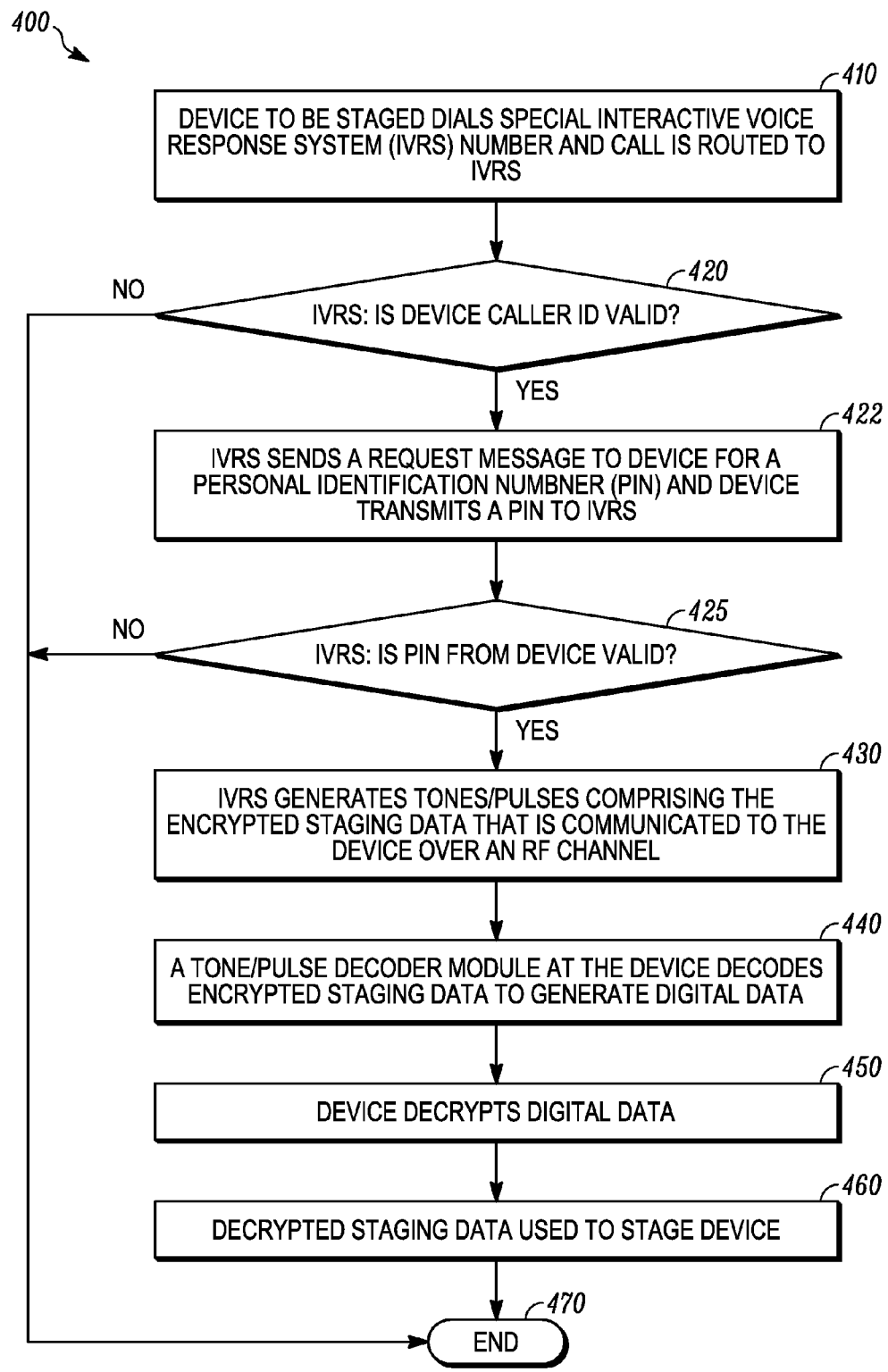

FIG. 4 is a flowchart illustrating a method 400 for staging a wireless communication device 120 over a wireless network in accordance with some embodiments of the present invention. Steps 410-425 and 450-470 of method 400 are similar to steps 310-325 and 350-370 of method 300 that are described above with respect to FIG. 3, and for sake of brevity the description of steps 310-325 and 350-370 will not be repeated here.

In the embodiments illustrated in FIG. 4, at step 430, the IVRS can generate a signal comprising a set of tones or pulses (i.e., meaningful digital data to the wireless communication device 120) that have encrypted staging data embedded therein (or are encoded with encrypted staging data), and communicate the signal (that includes the encrypted staging data) to an access point or base station, which relays the signal to the wireless communication device 120 over an RF channel, such as a RF voice channel. The method 400 then proceeds to step 440.

At step 440, the wireless communication device 120 receives the RF signal that was communicated over the RF channel and a tone/pulse decoder module at the wireless communication device 120 decodes the tones/pulses in the RF signal that are encoded with the encrypted staging data to generate digital data. Any known method for tone/pulse decoding can be utilized at step 440.

Figure 5:
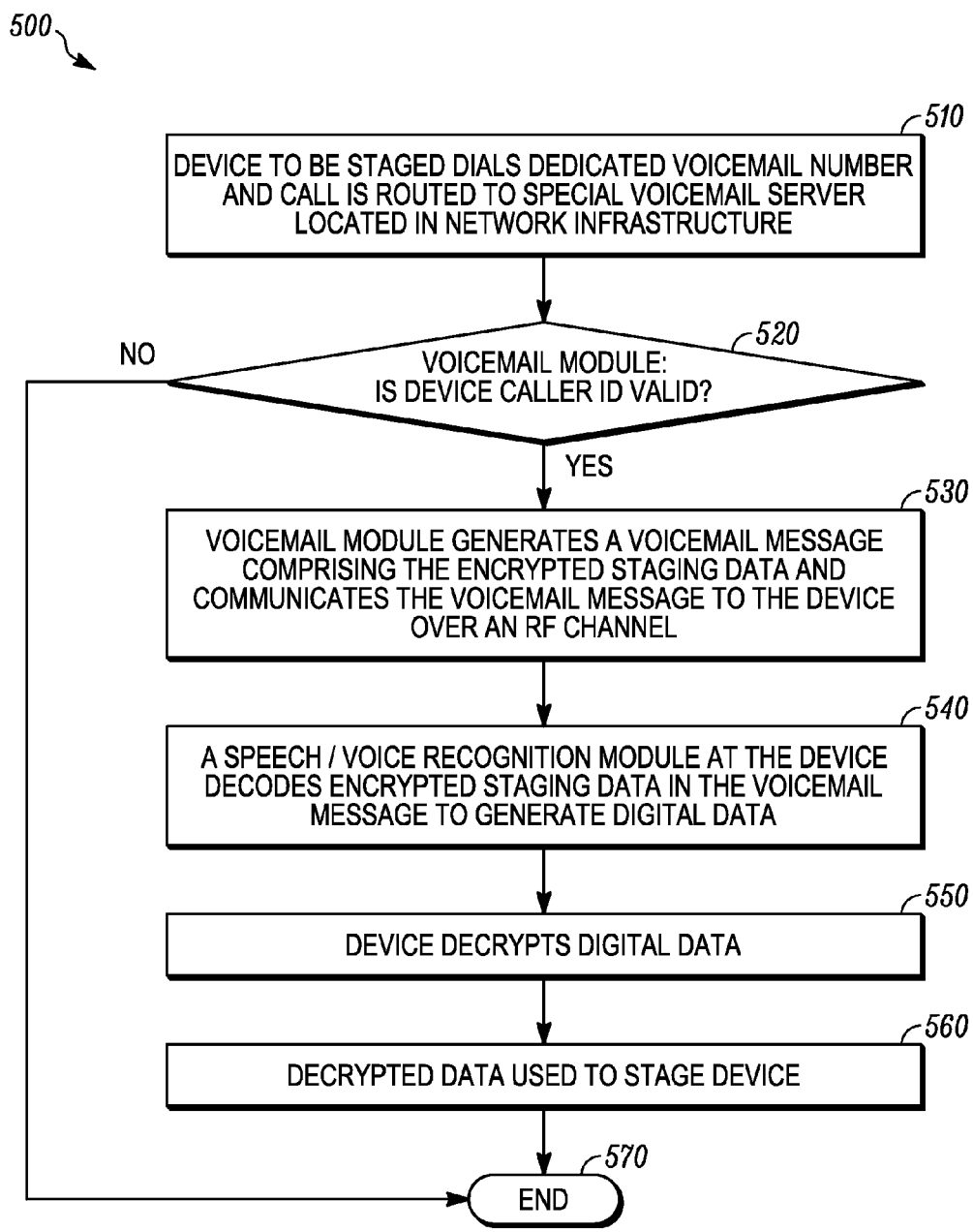

FIG. 5 is a flowchart illustrating a method 500 for staging a wireless communication device 120 over a wireless network in accordance with some embodiments of the present invention.

Method 500 begins at step 510, when a wireless communication device 120 that needs to be staged dials a special dedicated voicemail number to transmit a call over the air that is received by a base station or access point. The call is routed to a special voicemail module located at a voicemail server in the network infrastructure 140; this voicemail module is designed to generate voicemail for a particular pre-defined set of caller ID numbers associated with particular enterprise wireless communication devices.

At step 520, the special voicemail module authenticates the wireless communication device 120. Any known authentication method can be used. In one implementation, at step 520 the special voicemail module determines whether the caller ID associated with the wireless communication device 120 is one of the particular pre-defined set of caller ID numbers associated with the particular enterprise wireless communication devices. If not, the method 500 ends step 570.

When the caller ID associated with the wireless communication device 120 is one of the particular pre-defined set of caller ID numbers associated with the particular enterprise wireless communication devices, the method 500 proceeds to step 530. At step 530, the special voicemail module can generate a voicemail message that is encoded with encrypted staging data, and communicate the voicemail message to an access point or base station, which relays the voicemail message to the wireless communication device 120 over an RF channel, such as a RF voice channel. As above, the staging data can be encrypted using any known encryption technique, and the wireless communication device 120 can generate (e.g., from storage or via derivation) an encryption key that can be used to decrypt the encrypted staging data. The method 500 then proceeds to step 540.

At step 540, the wireless communication device 120 receives voicemail message via the RF signal that was communicated over the RF channel and a speech/voice recognition module at the wireless communication device 120 decodes the encrypted staging data in the voicemail message to generate digital data. Any known method for speech/voice recognition can be utilized at step 540.

Steps 550-570 of method 500 are similar to steps 350-370 of method 300 that are described above with respect to FIG. 3, and for sake of brevity the description of steps 350-370 will not be repeated here.

Figure 6:
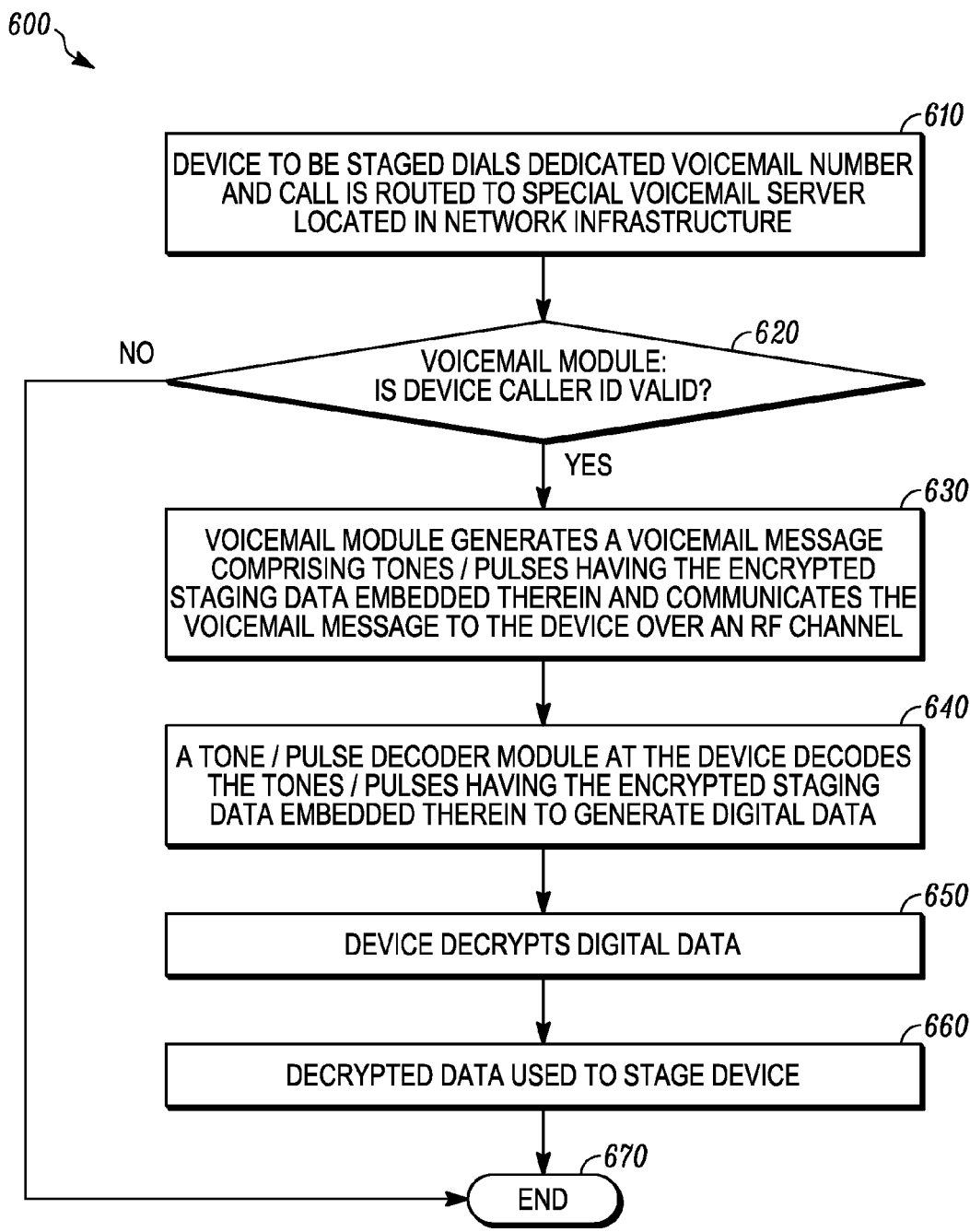

FIG. 6 is a flowchart illustrating a method 600 for staging a wireless communication device 120 over a wireless network in accordance with some embodiments of the present invention. Steps 610-620 and 650-670 of method 600 are similar to steps 510-520 and 550-570 of method 500 that are described above with respect to FIGS. 3 and 5, and for sake of brevity the description of steps 510-520 and 550-570 will not be repeated here.

In the embodiments illustrated in FIG. 6, at step 630, the voicemail module can generate a voicemail message comprising a set of tones or pulses (i.e., meaningful digital data to the wireless communication device 120) that have encrypted staging data embedded therein (or are encoded with encrypted staging data), and communicates the voicemail message (that includes the encrypted staging data) to an access point or base station, which relays the signal to the wireless communication device 120 over an RF channel, such as a RF voice channel. The method 600 then proceeds to step 640.

At step 640, the wireless communication device 120 receives the RF signal that was communicated over the RF channel and a tone/pulse decoder module at the wireless communication device 120 decodes the tones/pulses in the RF signal that are encoded with the encrypted staging data to generate digital data. Any known method for tone/pulse decoding can be utilized at step 640.

Figure 7:
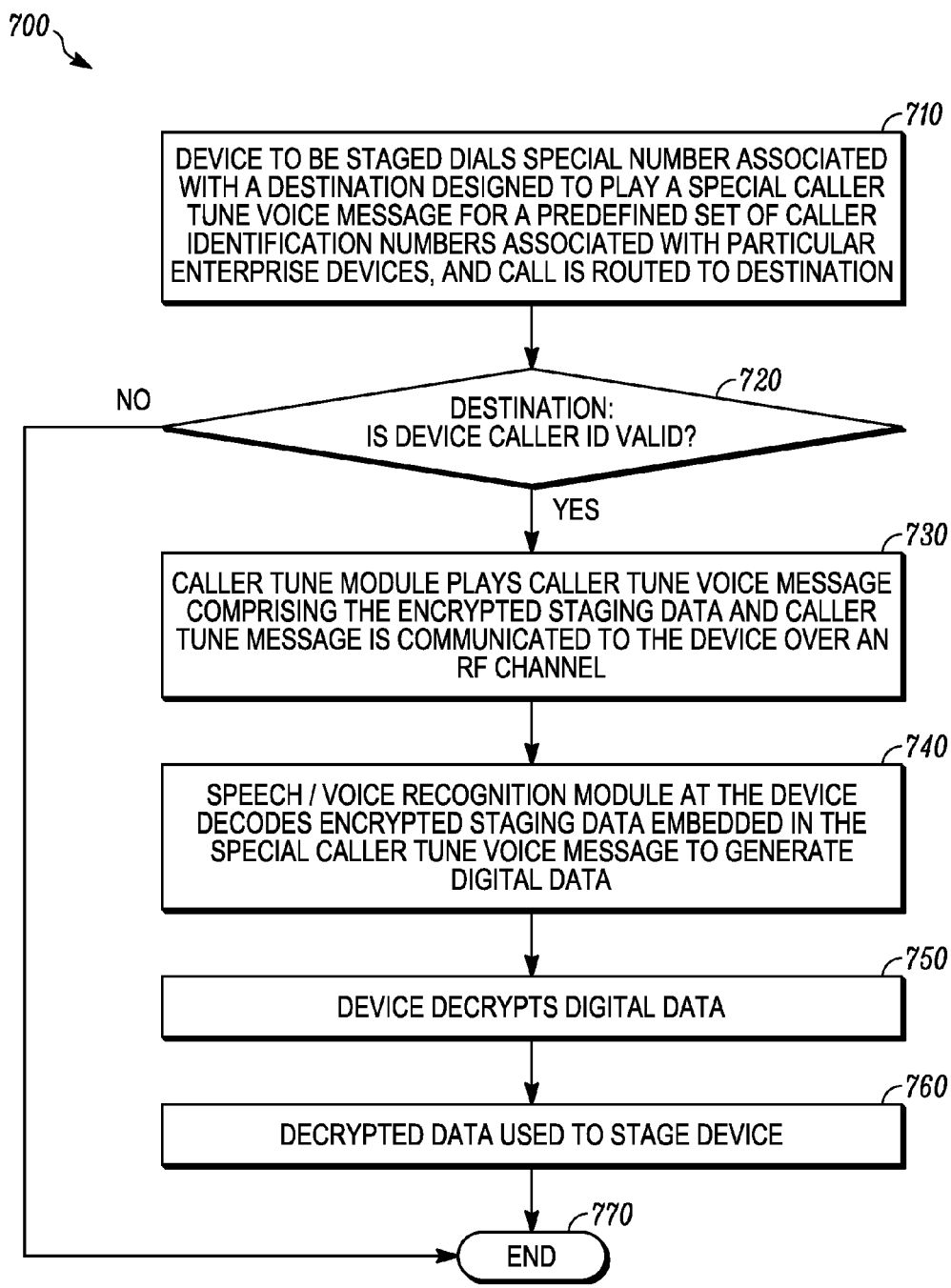

FIG. 7 is a flowchart illustrating a method 700 for staging a wireless communication device 120 over a wireless network in accordance with some embodiments of the present invention.

Method 700 begins at step 710 when a wireless communication device 120 that needs to be staged dials a special number associated with a destination (which can be a network server, another wireless communication device, etc.), and a call from the wireless communication device 120 is transmitted over the air to a base station or access point, and is then routed to the destination. As will be described below, for particular enterprise wireless communication devices associated with a pre-defined set of caller identification numbers, the destination is designed to play a special caller tune voice message. In other words, the destination is designed to generate the special caller tune voice message for a particular pre-defined set of caller ID numbers associated with particular enterprise wireless communication devices. As used herein, the term "caller tune" refers to a feature some telecom service providers provide, where when a recipient receives a call, infrastructure plays music for the calling party until the destination party answers the call. As used herein, the term "caller tune voice message" refers to a feature by which, when a recipient receives a call, infrastructure plays a voice message for a calling party until the destination party answers the call; this voice message comprises a human voice recording in any spoken language which includes encrypted staging data.

At step 720, the destination authenticates the wireless communication device 120. Although any known authentication method can be used, in one implementation, at step 720 the destination determines whether the caller ID associated with the wireless communication device 120 is one of the particular pre-defined set of caller ID numbers associated with the particular enterprise wireless communication devices. If not, the method 700 ends step 770.

When the caller ID associated with the wireless communication device 120 is one of the particular pre-defined set of caller ID numbers associated with the particular enterprise wireless communication devices, the method 700 proceeds to step 730. At step 730, a caller tune module at the destination can play a special caller tune voice message that is encoded with encrypted staging data, and can communicate the special caller tune voice message to an access point or base station, which relays the special caller tune voice message to the wireless communication device 120 over an RF channel, such as a RF voice channel. As above, the staging data can be encrypted using any known encryption technique, and the wireless communication device 120 can generate (e.g., from storage or via derivation) an encryption key that can be used to decrypt the encrypted staging data. The method 700 then proceeds to step 740.

At step 740, the wireless communication device 120 receives the special caller tune voice message via the RF signal that was communicated over the RF channel, and a speech/voice recognition module at the wireless communication device 120 decodes the encrypted staging data in the special caller tune voice message to generate digital data. Any known method for speech/voice recognition can be utilized at step 740.

Steps 750-770 of method 700 are similar to steps 350-370 of method 300 that are described above with respect to FIG. 3, and for sake of brevity the description of steps 350-370 will not be repeated here.

Figure 8:
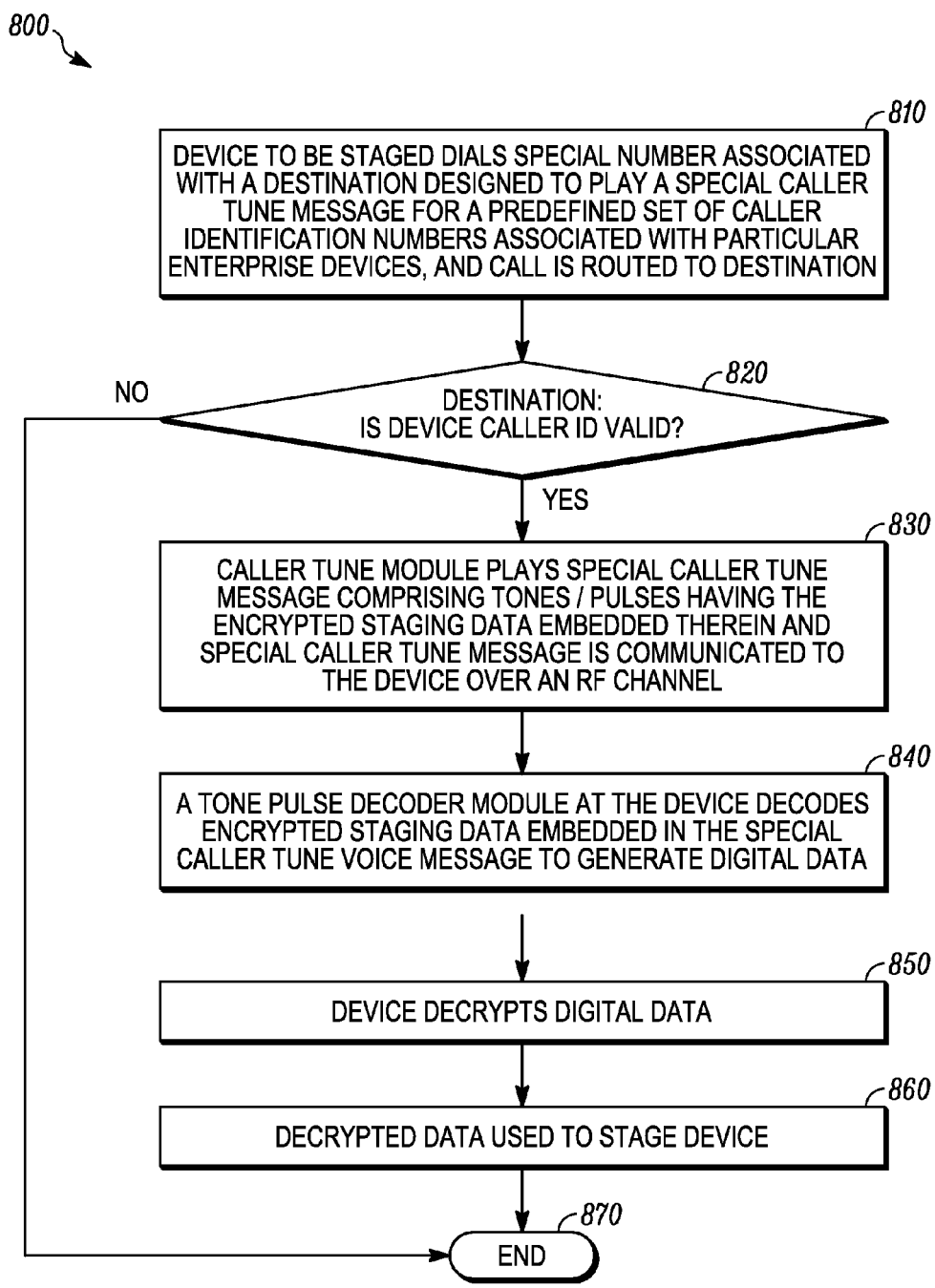

FIG. 8 is a flowchart illustrating a method 800 for staging a wireless communication device 120 over a wireless network in accordance with some embodiments of the present invention.

Method 800 begins at step 810 when a wireless communication device 120 that needs to be staged dials a special number associated with a destination (which can be a network server, another wireless communication device, etc.), and a call from the wireless communication device 120 is transmitted over the air to a base station or access point, and is then routed to the destination. Steps 820 and 850-870 of method 800 are similar to steps 720 and 750-770 of method 700 that are described above with respect to FIGS. 3 and 5 and 7, and for sake of brevity the description of steps 720 and 750-770 will not be repeated here.

In the embodiments illustrated in FIG. 8, like those in FIG. 7, the destination is designed to generate and play a special caller tune message for particular enterprise wireless communication devices associated with a particular pre-defined set of caller ID numbers. However, in the embodiments illustrated in FIG. 8, the special caller tune message comprises a set of tones or pulses (i.e., meaningful digital data to the wireless communication device 120) that have encrypted staging data embedded therein (or are encoded with encrypted staging data). As used herein, the term "special caller tune message" refers to a feature by which, when a recipient receives a call, infrastructure plays a message for a calling party until the destination party answers the call; this message comprises a set of tones, pulses or which contains encrypted staging data embedded within.

At step 830, a caller tune module at the destination can generate and play a special caller tune message that includes tones or pulses that includes the encrypted staging data, and can then communicate the special caller tune message to an access point or base station, which relays the special caller tune message to the wireless communication device 120 over an RF channel. As above, the staging data can be encrypted using any known encryption technique, and the wireless communication device 120 can generate (e.g., from storage or via derivation) an encryption key that can be used to decrypt the encrypted staging data.

At step 840, the wireless communication device 120 receives the special caller tune message via the RF signal that was communicated over the RF channel, and a tone/pulse decoder module at the wireless communication device 120 decodes the tones/pulses in the special caller tune message (that are encoded with the encrypted staging data) to generate digital data. Any known method for tone/pulse decoding can be utilized at step 840.

The various embodiments described above describe staging of wireless communication devices. One non-limiting example of a wireless communication device will now be described with reference to FIG. 9.

Exemplary Wireless Communication Device

Figure 9:
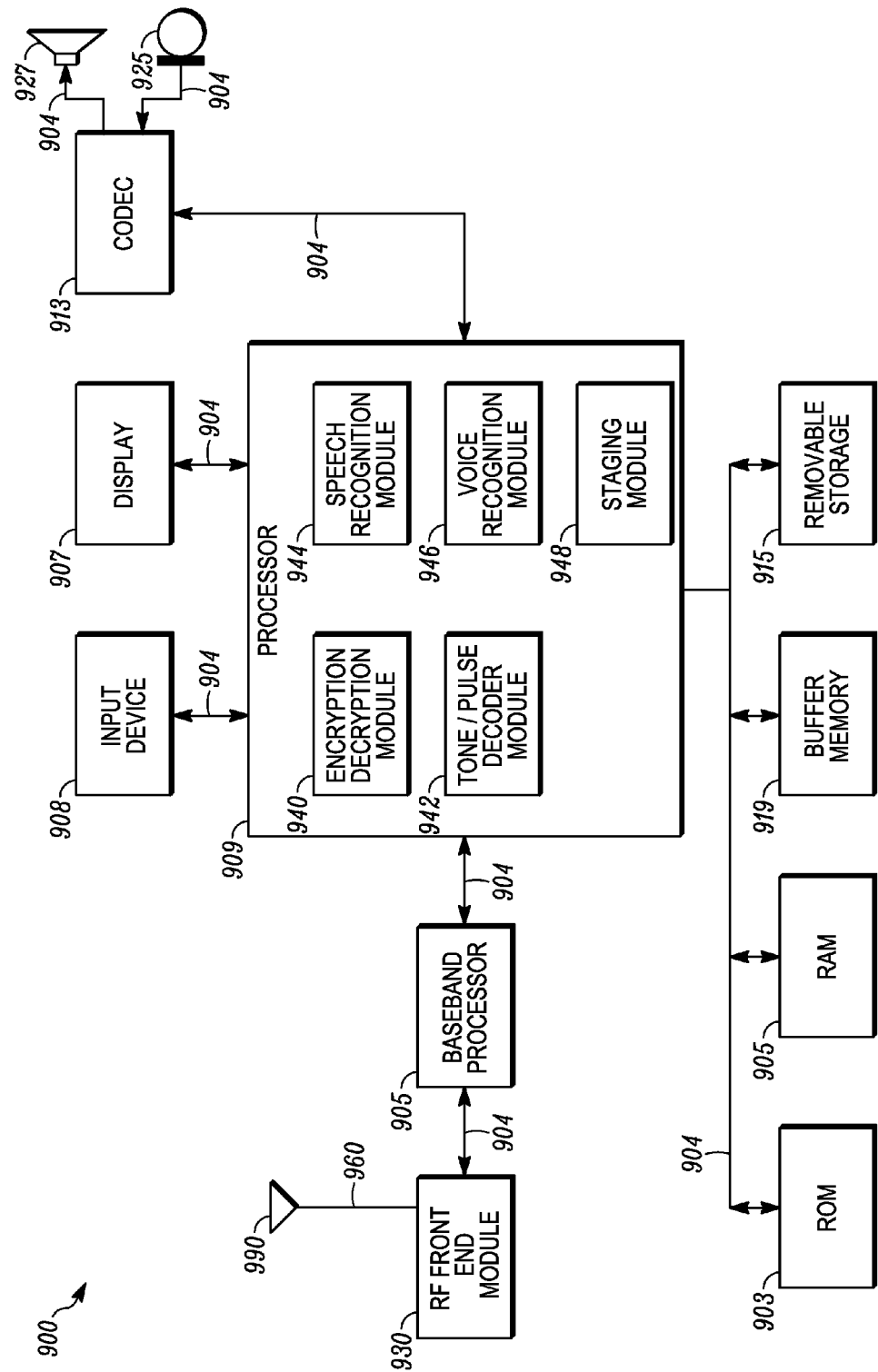
FIG. 9 is a block diagram of an exemplary wireless communication device.

FIG. 9 is a block diagram of an exemplary wireless communication device 900.

The wireless communication device 900 includes at least one antenna 960, an RF front end module, a baseband processor 905, a processor 901, a coder/decoder (CODEC) 913, a display 907, input devices 908 (keyboards, touch screens, etc.), a program memory 903, 905 for storing operating instructions that are executed by the processor 901, a buffer memory 911, a removable storage unit 915, a microphone 925 and an earpiece speaker 927 (i.e., a speaker used for listening by a user of the device 900). The various blocks are coupled to one another as illustrated in FIG. 9. In some implementations, the various blocks can communicate with one another via a bus, such as a PCI bus. The wireless communication device 900 can also include a power source such as a battery (not shown). The wireless communication device 900 can be an integrated unit containing at least all the elements depicted in FIG. 9, as well as any other elements necessary for the wireless communication device 900 to perform its particular functions. As will be appreciated by those skilled in the art, various other elements, components and modules can be included depending on the implementation.

The processor 901 controls an overall operation of the wireless communication device 900. The processor 901 can include one or more microprocessors, microcontrollers, DSPs (digital signal processors), state machines, logic circuitry, or any other device or devices that process information based on operational or programming instructions. Such operational or programming instructions can be, for example, stored in the program memory that may be an IC (integrated circuit) memory chip containing any form of RAM (random-access memory) or ROM (read-only memory), a floppy disk, a CD-ROM (compact disk read-only memory), a hard disk drive, a DVD (digital video disc), a flash memory card or any other medium for storing digital information. In one implementation, the Read Only Memory (ROM) 903 stores microcodes of a program for controlling the processor 901 and a variety of reference data, and the Random Access Memory (RAM) 905 is a working memory of the processor 901 and temporarily stores data that are generated during the execution of the program. The buffer memory 911 may be any form of volatile memory, such as RAM, and is used for temporarily storing received information packets. The removable storage 915 stores a variety of updateable data, and can be implemented using Flash RAM. One of ordinary skill in the art will recognize that when the processor 901 has one or more of its functions performed by a state machine or logic circuitry, the memory 903, 905 containing the corresponding operational instructions may be embedded within the state machine or logic circuitry. Elements such as an encryption/decryption module 940, a tone/pulse decoder module 942, a speech recognition module 944, voice recognition module 946, staging module 948 responsible for applying device settings and requesting/installing software from server, etc. can be implemented at the processor and/or memory.

The coder-decoder (CODEC) 913 communicates with the processor 901 over a bus 904. The speaker 927 and the microphone 925 connected to the codec 313 serve as an audio input/output block for communication. The CODEC 913 converts digital data from the processor 901 into analog audio signals and outputs the analog audio signals through the speaker 927. Also, the CODEC 913 converts audio signals received through the microphone 925 into digital data and provides the digital data to the processor 901.

Working together the RF front end module 930 and baseband processor 905 enable the wireless communication device 900 to communicate information packets over the air and acquire information packets that are processed at the processor 901. In this regard, the RF front end module 930 and baseband processor 905 include conventional circuitry to enable transmissions over a wireless communication channel. The implementations of the RF front end module 930 and baseband processor 905 depend on the implementation of the wireless communication device 900. In general, the baseband processor 905 processes the baseband signals that are transmitted/received between the RF front end module 930 and the processor 901. The RF front end module 930 down-converts the frequency of an RF signal received through an antenna 990 and provides the down-converted RF signal to a baseband processor 905.

The baseband processor 905 receives digital baseband data (originally generated at the CODEC 913) from the processor 901 and converts the baseband data into real (I) and imaginary (Q) data streams. Although not shown, RF front end module 930 can also include conventional transmitter circuitry including a modulator, an upconverter module and a power amplifier. The modulator (not shown) is designed to modulate information from the baseband processor 905 onto a carrier frequency. The frequency of the modulated carrier is upconverted by the upconverter module to an RF frequency to generate an RF signal. The RF signal is amplified by a power amplifier (not shown) to a sufficient power level for radiation into free space and transmitted via the antenna 990. Although not shown, the RF signal is provided from the power amplifier to the antenna 990 over a transmission path between the power amplifier and antenna 990.

The antenna 960 comprises any known or developed structure for radiating and receiving electromagnetic energy in the frequency range containing the wireless carrier frequencies. The antenna 960 is coupled and matched to the electronic circuitry of the communication device 900 as is known in the art. As such, other elements (not shown) such as an antenna switch, duplexer, circulator, or other highly isolative means can also be present.

Those of skill will appreciate that the various illustrative logical blocks, modules, circuits, and steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. As used herein the term "module" refers to a device, a circuit, an electrical component, and/or a software based component for performing a task. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

Furthermore, the connecting lines or arrows shown in the various figures contained herein are intended to represent example functional relationships and/or couplings between the various elements. Many alternative or additional functional relationships or couplings may be present in a practical embodiment.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof

What is claimed is:

1. A method for staging a wireless communication device over a wireless network, the method comprising the steps of:
    communicating a call from the wireless communication device to network infrastructure via a wireless communication station;
    communicating an RF signal to the wireless communication device over an RF channel, wherein the RF signal comprises an audio signal including tones/pulses embedded with encrypted staging data, and wherein the staging data comprises a list of software packages to be installed on the wireless communication device and respective server locations of the software packages;
    receiving the RF signal at the wireless communication device;
    converting the RF signal into the audio tones/pulses in a tone/pulse decoder module at the wireless communication device;
    decrypting the encrypted staging data in the tone/pulse decoder module at the wireless communication device to generate decrypted staging data; and
    using the decrypted staging data to stage the wireless communication device.

2. A method according to claim 1, further comprising a step of authenticating the wireless communication device at the network infrastructure, which comprises the substeps of:
    determining, at the network infrastructure, whether the caller ID associated with the wireless communication device is valid;
    transmitting a request message from the network infrastructure to the wireless communication device for a personal identification number (PIN) when the caller ID associated with the wireless communication device is valid;
    receiving, at the network infrastructure, the PIN transmitted from the wireless communication device and determining whether the PIN transmitted from the wireless communication device is valid; and
    communicating, from the network infrastructure when the PIN transmitted from the wireless communication device is determined to be valid, the audio tones/pulses encoded with the encrypted staging data.

3. A method according to claim 1, wherein the staging data also comprises settings for the wireless communication device.

4. A wireless networking system, comprising:
    a wireless communication device;
    a wireless communication station designed to communicate with wireless communication device over the air via RF signals; and network infrastructure designed to receive a call from the wireless communication device via the wireless communication station, and communicate an RF signal to the wireless communication device over an RF channel, wherein the RF signal comprises an audio signal including tones/pulses embedded with encrypted staging data that comprises a list of software packages to be installed on the wireless communication device and respective server locations of the software packages, wherein the wireless communication device is designed to receive the RF signal, convert the RF signal into the audio tones/pulses in a tone/pulse decoder module at the wireless communication device, decrypt the encrypted staging data in the tone/pulse decoder module to generate decrypted staging data, and use the decrypted staging data to stage the wireless communication device.

* * * * *